(No Model.)

R. A. BRAUER & T. ROCHE.
HOSE COUPLING.

No. 302,093. Patented July 15, 1884.

WITNESSES:
Theo. G. Hoster
C. Sedgwick

INVENTOR:
R. A. Brauer
T. Roche
BY
Munn & Co
ATTORNEYS.

UNITED STATES PATENT OFFICE.

ROBERT AUGUST BRAUER AND THOMAS ROCHE, OF OSHKOSH, WISCONSIN.

HOSE-COUPLING.

SPECIFICATION forming part of Letters Patent No. 302,093, dated July 15, 1884.

Application filed November 20, 1883. (No model.)

*To all whom it may concern:*

Be it known that we, ROBERT A. BRAUER and THOMAS ROCHE, of Oshkosh, county of Winnebago, Wisconsin, have invented a new and Improved Hose-Coupling, of which the following is a full, clear, and exact description.

The object of our invention is to provide a new and improved coupling for uniting hose in such a manner that a steam, water, and gas tight joint will be formed.

The invention consists in a hose-coupling formed of a female and a male part, of which the former is provided with a spring-hook and with a staple, and the male part is provided with a notch, and with a hook adapted to pass into the staple.

The invention also consists in beveled projections formed on the hose-coupling sections for the purpose of protecting the locking devices.

Reference is to be had to the accompanying drawings, forming part of this specification, in which similar letters of reference indicate corresponding parts in all the figures.

Figure 1:
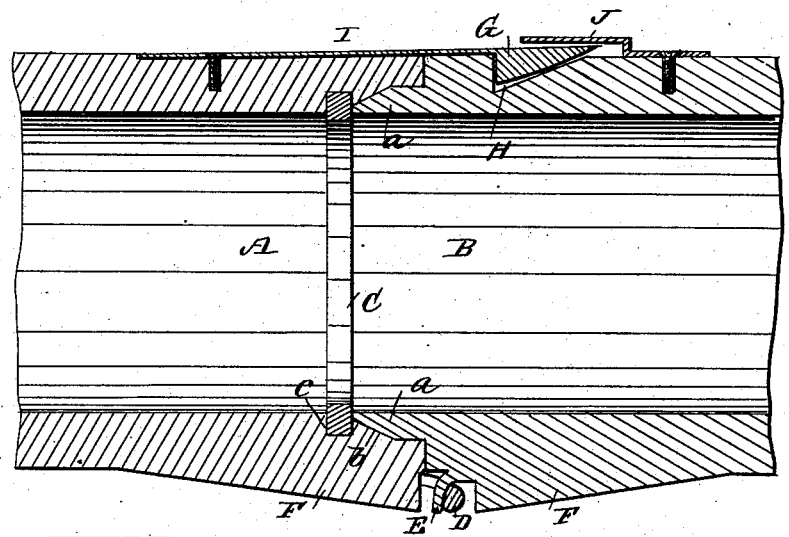
Figure 2:
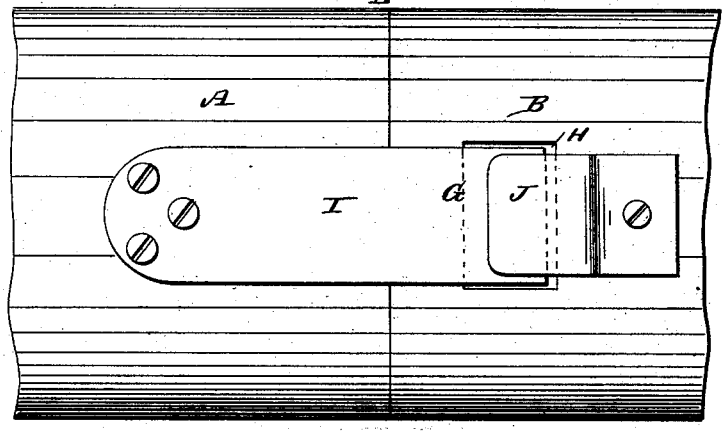
Figure 3:
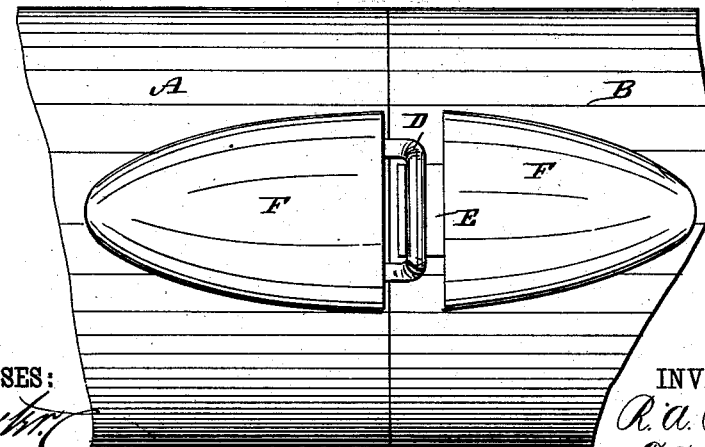

Figure 1 is a longitudinal sectional elevation of our improved hose-coupling. Fig. 2 is a face view of one side of the same, and Fig. 3 is a face view of the other side.

The hose-coupling consists of two short cylindrical parts, of which A is the female part and B the male part, fitting into the part A. The male part B is provided at its meeting end with a ridge, a, at its inner surface, which ridge has its outer surface beveled. The annular recess b, formed in the meeting end of the female part A, is also beveled, as shown. A packing-ring, C, is placed in a groove, c, at the back of the recess b of the female part. The ridge a forms a shoulder on the part B, fitting against the end of the female part A. On the end of the female part A a staple, D, is formed, which is adapted to receive an outwardly-projecting hook, E, formed on the end of the male part B. Tapering projections F are formed on the coupling-sections A B, contiguous to the hook E and staple D, which projections extend outward as far as the said hook and staple and prevent the said hook E and staple D from being injured by stones, &c., thus forming a protection for the hook and staple during rough usage of a hose. On the female part A a spring-strip, I, is secured diametrically opposite the staple D, the free end of which hook projects beyond the edge of the coupling-section, and is provided with a beveled head, G, which head is beveled from the outer end and surface of the strip I inward and toward the fixed end of the said strip I, thus forming a head adapted to pass into a beveled notch, H, in the outer surface of the coupling-section B. A guard, J, is pivoted to the outer surface of the male section B, adjoining the notch H, which guard is adapted to be swung over the head G, to prevent the same from leaving the notch H accidentally when the hose are coupled.

To couple the sections, the hook E is passed through the staple D and the ends of the sections are swung together, the beveled head G snapping into the notch H, and thus holding the sections in place in relation to each other, the end of the beveled ridge a coming to a bearing upon the packing-ring C and making the joint tight, the arrangement of the hook E and staple D and of the head G of the strip I with relation to each other being such that when the hook and staple are engaged and the sections swung together and locked the end of the ridge a will bear upon the packing-ring C.

Having thus described our invention, we claim as new and desire to secure by Letters Patent—

1. In a hose-coupling, the female section A, having a recess, c, and provided with a staple, D, and a locking device, I G, of the male section B, having a ridge, a, and provided with a hook, E, and a notch, H, and of the packing-ring C, substantially as described, and all being arranged with relation to each other substantially as specified.

2. In a hose-coupling, the combination, with the male section having a hook end and a notch or recess, H, and the female section having a staple, E, and a spring-hook, I G, of the guard J, pivoted on the male section, and adapted to be swung over the hook-head G when the sections are united, substantially as herein shown and described.

3. In a hose-coupling, the female part or section A, having a staple, D, a beveled projection, F, and a spring-hook, I G, in combination with the male section or part B, having a recess, H, a hook, E, and a beveled projection, F, substantially as herein shown and described.

ROBERT AUGUST BRAUER.
THOMAS ROCHE.

Witnesses:
E. B. HICKS,
A. H. READ.